US011886584B2

(12) United States Patent
Kivva et al.

(10) Patent No.: US 11,886,584 B2
(45) Date of Patent: Jan. 30, 2024

(54) SYSTEM AND METHOD FOR DETECTING POTENTIALLY MALICIOUS CHANGES IN APPLICATIONS

(71) Applicant: AO Kaspersky Lab, Moscow (RU)

(72) Inventors: Anton A Kivva, Moscow (RU); Lev V Pikman, Moscow (RU); Igor A Golovin, Moscow (RU)

(73) Assignee: AO KASPERSKY LAB, Moscow (RU)

(*) Notice: Subject to any disclaimer, the term of this patent is extended or adjusted under 35 U.S.C. 154(b) by 219 days.

(21) Appl. No.: 17/528,270

(22) Filed: Nov. 17, 2021

(65) Prior Publication Data

US 2022/0382862 A1 Dec. 1, 2022

(30) Foreign Application Priority Data

May 28, 2021 (RU) .......................... RU2021115371

(51) Int. Cl.
*G06F 21/56* (2013.01)

(52) U.S. Cl.
CPC .......... *G06F 21/565* (2013.01); *G06F 21/564* (2013.01)

(58) Field of Classification Search
CPC ....... G06F 21/565; G06F 21/564; G06F 21/56
See application file for complete search history.

(56) References Cited

U.S. PATENT DOCUMENTS

| 8,307,432 B1* | 11/2012 | Feng ..................... G06F 21/566 726/25 |
| 11,487,876 B1* | 11/2022 | Pryde ..................... G06F 21/56 |
| 2012/0240236 A1 | 9/2012 | Wyatt et al. |
| 2015/0229673 A1 | 8/2015 | Lee et al. |
| 2019/0394221 A1* | 12/2019 | Xiao ....................... G06F 16/16 |
| 2020/0228559 A1 | 7/2020 | McLane et al. |
| 2021/0019398 A1 | 1/2021 | Gordeychik et al. |
| 2021/0021553 A1 | 1/2021 | Benkovich et al. |

FOREIGN PATENT DOCUMENTS

| CN | 106778103 A | * | 5/2017 | ............ G06F 21/14 |
| CN | 106682505 B | * | 6/2020 | ........... G06F 21/561 |
| CN | 109543408 B | * | 10/2021 | ........... G06F 21/563 |
| EP | 1018077 B1 | * | 12/2001 | ........... G06F 21/566 |
| KR | 1020150044490 A | | 4/2015 | |
| RU | 2665910 C1 | * | 9/2018 | |

* cited by examiner

*Primary Examiner* — Jayesh M Jhaveri
(74) *Attorney, Agent, or Firm* — ArentFox Schiff LLP; Michael Fainberg

(57) ABSTRACT

Disclosed herein are systems and methods for detecting potentially malicious changes in an application. In one aspect, an exemplary method comprises, selecting a first file to be analyzed and at least one second file similar to the first file, for each of the at least one second file, calculating at least one set of features, identifying a set of distinguishing features of the first file by finding, for each of the at least one second file, a difference between a set of features of the first file and the calculated at least one set of features of the second file, and detecting a presence of potentially malicious changes in the identified set of distinguishing features of the first file.

21 Claims, 3 Drawing Sheets

SYSTEM AND METHOD FOR DETECTING POTENTIALLY MALICIOUS CHANGES IN APPLICATIONS

CROSS REFERENCE TO RELATED APPLICATIONS

The present application claims priority to Russian Patent Application No. 2021115371, filed on May 28, 2021, the entire content of which is incorporated herein by reference.

FIELD OF TECHNOLOGY

The present disclosure relates to the field of information security, e.g., by detecting potentially malicious changes in applications.

BACKGROUND

Nowadays, mobile operating systems (Android in particular) are gaining in popularity. The software they use is evolving at a rapid pace. Software updates are released on a regular basis, in which manufacturers correct errors and release updated versions of the software with new functionality. Software are often distributed in the form of archive files that contain application files, digital signatures for files, and a certificate with which the files are signed.

In order to induce a victim into visiting a fake site, attackers may use bulk or individually addressed email messages that masquerade as messages sent by a work colleague, a bank employee, or a representative of a government agency. However, these messages contain a malicious link. The text included in the message instructs or requires the victim to click on the link and immediately perform certain actions in order to avoid threats or some kind of serious consequences. Another approach fraudsters employ involves using an attachment in the form of a file that also contains malicious links or exploits vulnerable applications to further compromise the user's computer.

In addition, the types and numbers of malicious software (such as computer viruses, Trojans, and network worms) continue to increase. The malicious software is typically aimed at both causing damage to user data and harming the actual user of an electronic device infected with the malicious software. The damage may include corruption or deletion of user files, use of the computing resources of a user's device for "mining" cryptocurrencies, theft of confidential user data (correspondence, images, login names, passwords, bank card data), and other activities. In addition, malicious software is constantly changing as its authors adopt new methods of attack and adopt to avoid detection by security applications. Malicious software codes use various mechanisms. In one example, obfuscation of malicious codes may be used to change the appearance of source text or executable code of a program while preserving its functionality and making it more difficult to analyze, understand the operating algorithms, and modify the malicious code during de-compilation. In another example, the use of mechanisms to counteract emulation may be applied. For instance, the malicious software may be provided functionalities for recognizing that it is being executed in an emulator—thereby enabling the malicious code to avoid exhibiting a malicious activity.

One way to create malicious applications for mobile operating systems is: to embed malicious code into a legitimate application, where the legitimate application is used as a basis, and to modify the legitimate application by repackaging the archive and adding malicious functionality. Detecting such applications in which malicious codes are embedded with heuristic anti-virus analysis methods is problematic, because often a minimum amount of dangerous functionality is located in one file with a significant amount of secure functionality. Thus, attempts to make a generalized heuristic search for malicious code leads to a large number of false positives. For example, a known case of such application is the "Cam Scanner" application, which is available for installation via Google Play. In one version, at a time when the application had more than a hundred million installations, a malicious module was added to the application during one of the updates. As far as is known, a contract was made with a partner company, but along with the advertising the partner company provided a module that contained malicious code. Application developers are not analysts or security experts, so they simply built the module into the application themselves. It turned out, that malicious code was found in one hundred million installations of the application.

In another example, it is also known that advertising service companies are "balanced" on the edge, providing their advertising modules as part of partnership agreements with developers, but sometimes they "overstep" the limit. Their modules contain legitimate code, but which causes harm to users. For example, such a module can send an SMS (which is legitimate, since this is a function of a mobile device, but such an action has a financial impact on users) or read previously received messages (which is also legitimate, but should only be allowed for selected applications, otherwise it can cause harm in the form of access to sensitive user data). There are also cases of intentional modifications being delivered with the addition of malicious code.

In addition, there are applications that fall under the category of "riskware". Such applications are potentially dangerous, for example, remote administration applications can be used as backdoors, especially if they allow hidden launching and operation without any user notification of their operation.

Therefore, there is a need for a method and a system for improving information security, e.g., by detecting malicious applications.

SUMMARY

Aspects of the disclosure relate to information security, more specifically, to systems and methods of detecting potentially malicious changes in applications. For example, the method of the present disclosure is designed to create a solution that allows the search space for malicious code to be reduced to a relatively small set of data while significantly increasing the operational accuracy of heuristic rules when identifying an application that has been modified or an application to which malicious functionality has been added.

In one exemplary aspect, a method is provided for detecting potentially malicious changes in applications, the method comprising: selecting a first file to be analyzed and at least one second file similar to the first file, for each of the at least one second file, calculating at least one set of features, identifying a set of distinguishing features of the first file by finding, for each of the at least one second file, a difference between a set of features of the first file and the calculated at least one set of features of the second file, and detecting a presence of potentially malicious changes in the identified set of distinguishing features of the first file.

In one aspect, the similarity of the at least one second file with the first file is based on at least one of: names of the first file and the at least one second file, and versions of the first file and the at least one second file.

In one aspect, the at least one set of features comprises at least a hash of a dex-class.

In one aspect, the hash of the dex-class is calculated from at least one of: a code of a class without taking into account names of classes, or from the code of the class without taking into account names of methods of the class.

In one aspect, the at least one set of features comprises at least one of: information obtained from a manifest of the first file, information about requested permissions of the first file, and information about a presence of encrypted resources in the first file.

In one aspect, the presence of potentially malicious changes are detected using a method based on at least one of: heuristic analysis or signature analysis.

In one aspect, the potentially malicious change comprises at least one of: a change that indicates a presence of an application programming interface function that is known as being untrustworthy; and change that indicates a presence of at least one code loader.

In one aspect, the file selected to be analyzed comprises an application installation file for mobile devices.

According to one aspect of the disclosure, a system is provided for detecting potentially malicious changes in applications, the system comprising a hardware processor configured to: select a first file to be analyzed and at least one second file similar to the first file, for each of the at least one second file, calculate at least one set of features, identify a set of distinguishing features of the first file by finding, for each of the at least one second file, a difference between a set of features of the first file and the calculated at least one set of features of the second file, and detect a presence of potentially malicious changes in the identified set of distinguishing features of the first file.

In one exemplary aspect, a non-transitory computer-readable medium is provided storing a set of instructions thereon for detecting potentially malicious changes in applications, wherein the set of instructions comprises instructions for: selecting a first file to be analyzed and at least one second file similar to the first file, for each of the at least one second file, calculating at least one set of features, identifying a set of distinguishing features of the first file by finding, for each of the at least one second file, a difference between a set of features of the first file and the calculated at least one set of features of the second file, and detecting a presence of potentially malicious changes in the identified set of distinguishing features of the first file.

The method and system of the present disclosure are designed to provide information security, in a more optimal and effective manner, enabling legitimate modifications of applications to proceed while detecting applications that are modified to be malicious. Thus, in one aspect, the technical result of the present disclosure includes detecting potentially malicious changes in applications. In another aspect, the technical result includes reducing the number of applications that are falsely identified as being malicious. In yet another aspect, the technical result comprises providing information security by blocking malicious modifications of applications.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and a computer program for detecting potentially malicious changes in an application in accordance with aspects of the present disclosure. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

Figure 1:
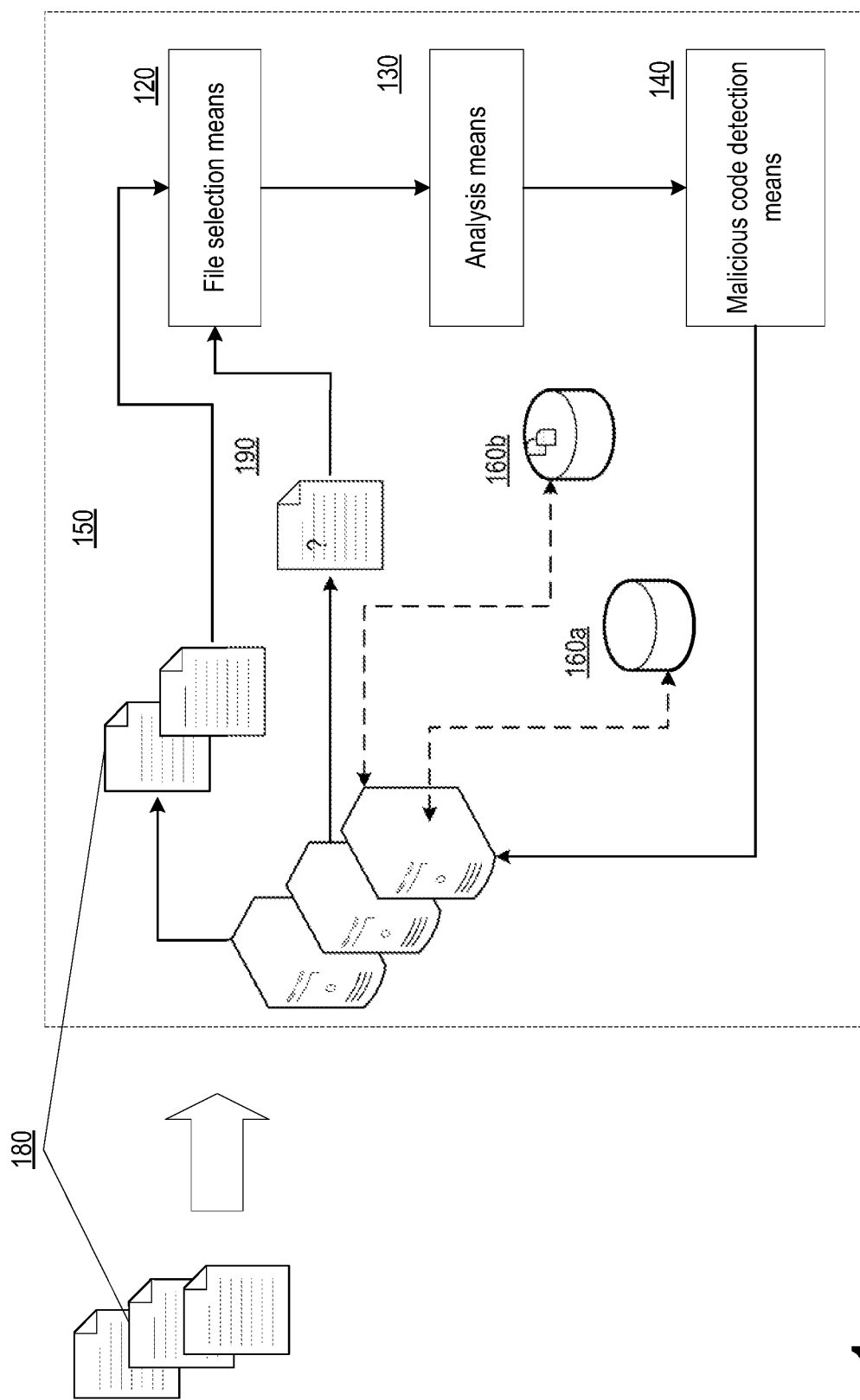
FIG. 1 illustrates a block diagram of an exemplary system for detecting potentially malicious changes in an application in accordance with aspects of the present disclosure.

FIG. 1 a block diagram of an exemplary system 100 for detecting potentially malicious changes in an application in accordance with aspects of the present disclosure. In one aspect, the system for detecting potentially malicious changes in an application comprises at least: a file selector 120, a file analyzer 130, and a malicious code detector 140.

In a preferred aspect, the system 100 is implemented on a remote server. In one aspect, the remove server comprises a cloud security service 150 (also referred to as a cloud service 150). An example of the cloud service 150 is the Kaspersky Security Network (KSN).

In one aspect, the file selector 120 is designed to select files 180 for further analysis for potentially malicious changes.

In one aspect, at least one file 180 is an installation file for an application of mobile devices.

In another aspect, at least one file 180 is an archive containing at least one executable file. Potentially malicious changes are changes to the file 180 that contain one or more additional functionalities that could cause damage to the user's device or data, if used. Any such identified potentially malicious change may require an additional in-depth analysis of its contents, in order to detect malicious content embedded therein.

In a preferred aspect, the files 180 are stored in the cloud service 150, for example, in the database 160a or in the file storage 160b. At the same time, the files 180 may be obtained by the cloud service 150 from agents installed on mobile devices of the users connected to the cloud service 150. In one aspect, the files 180 are obtained from the agents installed on the mobile devices of the users via communication channels known in the relevant art. In one aspect, the files 180 are obtained from agents hosted on various resources that collect the files 180 from those resources (file sharing services, forum sites, social media sites/applications). In another aspect, the cloud service 150 collects or receives files using its own tools (not shown in FIG. 1) that, for example, interact with the application programming interface (API) of digital application stores (for example, Google Play) or directly from the information resources of application manufacturers.

In one aspect, each file 180 received by the cloud service 150 or via agents installed on mobile devices is analyzed by an additional anti-virus scan. Then, when the analysis indicates that the file 180 does not contain a malicious code, the file 180 is marked as trusted. If the received file 180 has not been verified by an anti-virus scan as being a file that does not contain a malicious code, the file 180 is marked as untrusted.

In general, the file selector 120 selects, from a set of files, a file 190 for analysis. In addition, the file selector 120 selects, at least one file 180 that is similar to the file 190 that is already selected to be analyzed.

In one aspect, the file 190 to be analyzed is selected by the file selector 120 from files received by the cloud service 150 from agents, wherein the files were not analyzed for malicious content by the cloud service 150.

In one aspect, the file 180 is trusted.

In another aspect, the file 180 is untrusted. Thus, for identifying similarity with the file 190 that is selected to be analyzed, the method of the present disclosure may choose both trusted and untrusted similar files 180.

In one aspect, the file selector 120 determines the similarities of files based on at least one of the following features:
- a name of the file 190;
- a version of the file 190;
- a number of files inside the file 190;
- date and time of receipt of the file 190 by the cloud service 150; and
- other features that allow similarity between files to be determined.

In one aspect, the selected files 180 and 190 are passed to the file analyzer 130 by the file selector 120.

In one aspect, the file analyzer 130 calculates at least one set of distinguishing file features for the selected similar files 180 and the file 190 that is selected to be analyzed.

In one aspect, the distinguishing file features include at least one of:
- a hash of a dex-class, wherein the hash is calculated by the file analyzer 130 based on a class code without taking into account names of classes, names of the class variables, and without taking into account names of the class methods;
- information obtained from a manifest of the file 190;
- information about requested permissions of the file 190;
- a presence of resources in the file 190;
- a presence of so-libraries in the file 190; and
- other data about the file 190 that can be presented as an unordered set.

In one aspect, when the distinguishing file features include the presence of resources in the file 190, the resources comprise encrypted resources.

It is worth noting that the sets of distinguishing file features may be calculated from individual features of: the file 190 that is selected to be analyzed, the files 180 selected as being similar to the file 190 which is selected to be analyzed, or any combination of features of the file 190 that is selected to be analyzed and the files 180 selected as being similar to the file 190.

For example, if there is a file (A) and a potentially modified file (B) to be analyzed, the file analyzer 130 calculates one or more sets of individual features of the files (A) and (B) as follows:

$S(t, A)$ and $S(t, B)$, where t is the file feature.

The file analyzer 130 then calculates the set of distinguishing features of the files, while performing an operation to find the difference of the sets; that is, from the set of features of the file 190 to be analyzed it subtracts the set of features of each selected similar file 180:

$S(t, B) - S(t, A) = Sm(t, BA)$.

It is worth noting that the file analyzer 130 can use methods of finding the difference of sets as known in the relevant art. The choice of method for finding the difference of the sets depends on the file feature (t) and can be modified by the file analyzer 130 to improve the quality of the results.

In one aspect, the sets $Sm(t, BA)$ of distinguishing file features are passed by the file analyzer 130 to the malicious code detector 140.

In one aspect, the malicious code detector 140 detects potentially malicious changes in the resulting sets of file features after the subtraction.

In one aspect, the potentially harmful changes comprise at least one of:
- a presence of API functions known not to be trusted (for example, sending an SMS, sending an email, sending a message, requests for payment);
- a presence of loaders that use loading of code from encrypted files, or use code loading from sections of files not intended for code storage, or use code loading from third-party servers; and
- a presence of obfuscated code.

In one aspect, the malicious code detector 140 uses heuristic analysis methods known in the relevant art for identifying potentially malicious changes.

In one aspect, the malicious code detector 140 uses signature analysis techniques known in the relevant art for identifying potentially malicious changes.

In one aspect, the malicious code detector 140 calculates a degree of severity of harmful changes in the file 190 to be analyzed. In one aspect, the degree of severity of the harmful changes is specified using a range of values, e.g., where 0 represents a guaranteed safe file and 100 represents a guaranteed malicious file. In one aspect, the degree of severity of the harmful changes to the file 190 can be calculated by combining weights of the potentially malicious changes and the number of potentially malicious changes.

In one aspect, when potentially malicious changes are detected, if the degree of severity associated with the malicious code exceeds a certain threshold value, the malicious code detector 140 sends the file 190 to the cloud service 150 for more thorough analysis.

In one aspect, the malicious code detector 140, based on the degree of severity of the harmful changes to the file selected to be analyzed 190, may transfer, the file 190 to a device of an information security specialist for analysis.

Examples of the system 100 detecting the potentially malicious changes in an application in accordance with aspects of the present disclosure are presented below.

In one example, the method of the present disclosure is applied to detect malicious changes to applications used by advertising services. These malicious changes are based on a well-known popular technique among advertising companies that provide unscrupulous advertising services. These unscrupulous companies add a loader to the application itself, where a file with an encrypted code is added to the resources of the distribution file (apk). The dex-file in the file 190 that is being analyzed is changed only slightly, i.e., only the loader code is added. Individually, each such change is insignificant and the application would be identified as safe when being analyzed by systems without the benefit of the teachings of the present disclosure. If, however, an application from such unscrupulous companies is analyzed by the system of the present disclosure, the result will be as follows.

The file selector 120 selects similar files from the application in the apk format: a trusted file 180 and the file 190 which is selected to be analyzed.

Then, the file analyzer 130 analyzes the selected files and obtains the following as a result:
  a trusted file 180, one folder of which contains 50 files as a result of the operation of the file analyzer 130, and
  a file 190 to be analyzed, which contains 51 files in the same folder.

As a result of the analysis, the 51st file of the file 190 is determined as being: a file having an unknown type, a file that is encrypted, and a file that possesses a very high entropy. In addition, a modified dex-file, located in the file 190, will be detected from a file located in the trusted file 180. The malicious code detector 140 uses heuristic analysis methods to determine that the 51st file is a loader that downloads codes from an encrypted file, and thereby identifies potentially malicious changes to the file 190 that is selected to be analyzed.

In one aspect, as a result of the determination via the heuristic analysis, file 190 is sent by the malicious code detector 140 to the cloud service 150 for more in-depth analysis.

In one aspect, in addition, information about the results of the analysis by the file analyzer 130 may also be sent along with the file 190.

In one example, the method of the present disclosure is applied to detect malicious changes to applications, the file selector 120 chooses two similar files. The trusted file 180 is obtained from an official store (such as Google Play). The file 190 to be analyzed with a similar package name and version is received from a third-party web site that distributes applications.

Then, suppose the file analyzer 130 has detected an unusual dex-file in the file 190 and the detected unusual dex-file is sent to the malicious code detector 140 for analysis. Then, using heuristic analysis, the malicious code detector 140 detects a loader in the above file (dex-file) and downloaded code in the "Android support" Java package.

It is important to note that the "Android support" Java package is included in most applications and usually contains only "default" code added by the AndroidStudio compiler. Consequently, this package is usually not checked, by default. As a result, this file 190 to be analyzed is sent by the malicious code detector 140 to the cloud service 150 for more in-depth analysis.

It is worth noting that in another aspect, when a similar file 180 is not selected by the file selector 120 for the file 190 to be analyzed, the present system functions and perform actions using the file analyzer 130 and the malicious code detector 140. For example, suppose a file 190 which has a small size is obtained to be analyzed. Suppose the file 190 does not have a software platform (framework) and can send SMS messages. As a result, the file selector 120 may not select a similar file 180, and the file analyzer 130 determines a set of distinguishing features of the file that contains all the code of the file 190 to be analyzed. Then, the malicious code detector 140, using a signature or heuristic analysis method, detects in the code API function calls that send SMS messages. Then, the file 190 will be sent to the cloud service 150 for more in-depth analysis.

Figure 2:
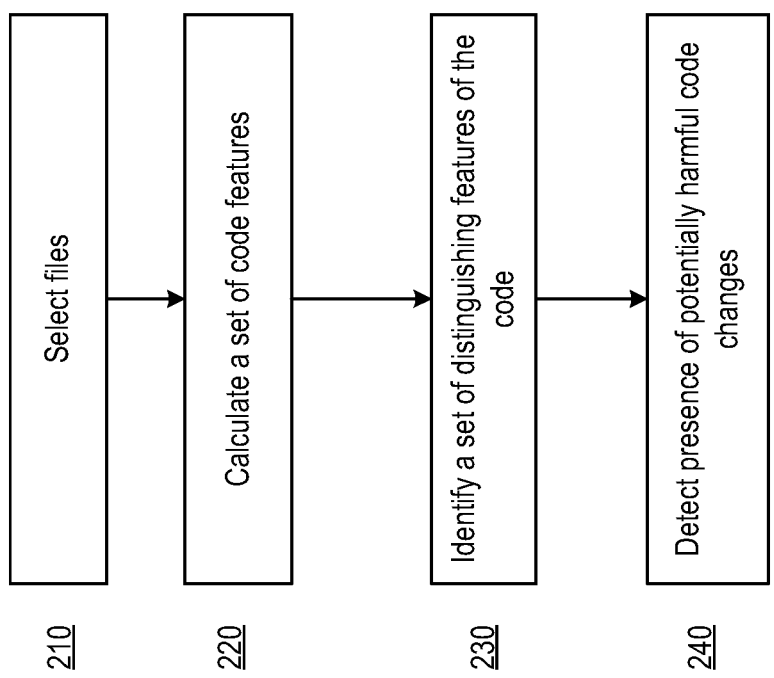
FIG. 2 illustrates a method for detecting potentially malicious changes in an application in accordance with aspects of the present disclosure.

FIG. 2 illustrates a method 200 for detecting potentially malicious changes in an application in accordance with aspects of the present disclosure.

In step 210, using the file selector 120, method 200 selects a file 190 to be analyzed and selects at least one file 180 that is similar to a file 190 that is selected to be analyzed.

In one aspect, the file 190 that is selected to be analyzed comprises an installation file for an application intended to be used by mobile devices.

In one aspect, the file 190 that is selected to be analyzed comprises an archive containing at least one executable file.

In one aspect, the at least one file 180 that that is similar to the file 190 is selected based on a file similarity determined based on at least one of the following features:
  a name of the file 190 that is selected to be analyzed;
  a version of the file 190 that is selected to be analyzed;
  a number of files inside the file 190 that is selected to be analyzed;
  a date and time of receipt of the file 190 that is selected to be analyzed by a cloud service 150; and
  any other feature that allows the similarity between files to be determined.

In step 220, by the file analyzer 130, for each file 180 selected as being similar to the file 190, method 200, calculates at least one set of features. The set of features of the files and their calculation are discussed in detail in conjunction with the description of FIG. 1.

In one aspect, the set of features comprises at least a hash of a dex-class, which is calculated from at least one of: a code of a class without taking into account names of classes or from the code of the class without taking into account the names of methods of the class.

In one aspect, the set of features comprises: information obtained from a manifest of the file 190, information about requested permissions of the file 190, or information about a presence of encrypted resources in the file 190.

In step 230, using the file analyzer 130, method 200 identifies a set of distinguishing features of the file 190 selected to be analyzed. In one aspect, the set of distinguishing features of the file are identified by finding a difference between sets of code features of the file 190 and each selected file 180. The file analyzer 130 may use methods of finding the difference between sets of features, as known in the relevant art. The choice among various methods of finding the difference between the sets of features depends on the file feature.

In one aspect, the method of finding the difference may be modified by the file analyzer 130 in order to improve the quality of the results.

In step 240, using the malicious code detector 140, method 200 detects potentially malicious changes in the sets of distinguishing file features.

In various aspects, the malicious code is identified by heuristic analysis and/or by signature analysis. The potentially malicious changes are described above in conjunction with the description of FIG. 1.

Figure 3:
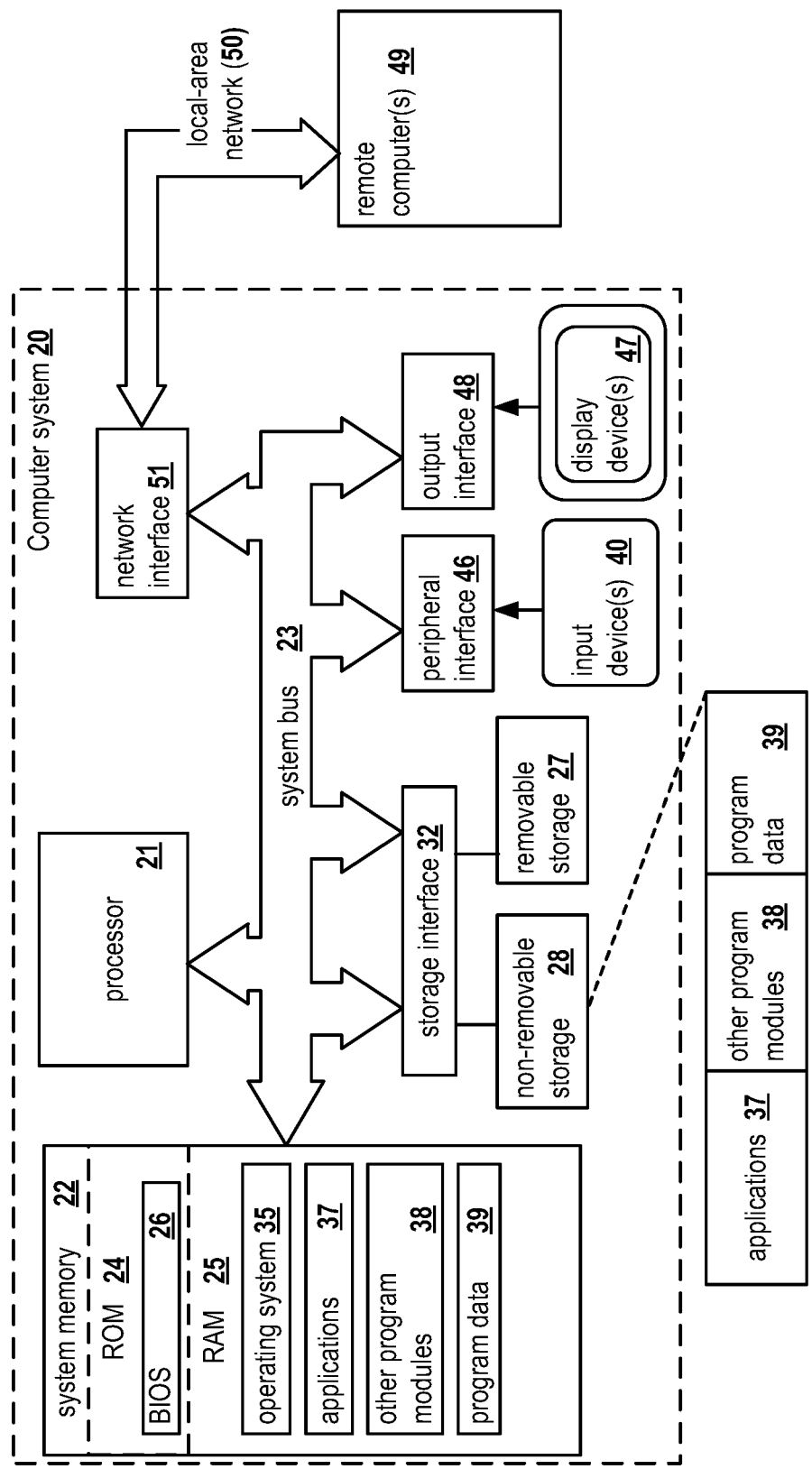
FIG. 3 presents an example of a general purpose computer system on which aspects of the present disclosure can be implemented.

FIG. 3 is a block diagram illustrating a computer system 20 on which aspects of systems and methods for detecting potentially malicious changes in an application may be implemented. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 3, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for detecting potentially malicious changes in an application, the method comprising:
   selecting a first file to be analyzed and at least one second file similar to the first file, wherein the similarity of the at least one second file with the first file is based on at least one of: names of the first file and the at least one second file, and versions of the first file and the at least one second file;
   for each of the at least one second file, calculating at least one set of features;
   identifying a set of distinguishing features of the first file by finding, for each of the at least one second file, a difference between a set of features of the first file and the calculated at least one set of features of the second file; and
   detecting a presence of potentially malicious changes in the identified set of distinguishing features of the first file, characterized in that the potentially malicious changes comprise at least a change that indicates a presence of at least one code loader for loading of code from encrypted files or from sections of files not intended for code storage, or from third-party servers.

2. The method of claim 1, wherein the at least one set of features comprises at least a hash of a dex-class.

3. The method of claim 2, wherein the hash of the dex-class is calculated from at least one of: a code of a class without taking into account names of classes, or from the code of the class without taking into account names of methods of the class.

4. The method of claim 1, wherein the at least one set of features comprises at least one of:
   information obtained from a manifest of the first file,
   information about requested permissions of the first file, and
   information about a presence of encrypted resources in the first file.

5. The method of claim 1, wherein the presence of potentially malicious changes are detected using a method based on at least one of: heuristic analysis or signature analysis.

6. The method of claim 1, wherein the potentially malicious changes further comprise:
   a change that indicates a presence of an application programming interface function that is known as being untrustworthy.

7. The method of claim 1, wherein the file selected to be analyzed comprises an application installation file for mobile devices.

8. A system for detecting potentially malicious changes in an application, comprising:
   at least one processor configured to:
      select a first file to be analyzed and at least one second file similar to the first file, wherein the similarity of the at least one second file with the first file is based on at least one of: names of the first file and the at least one second file, and versions of the first file and the at least one second file;
      for each of the at least one second file, calculate at least one set of features;
      identify a set of distinguishing features of the first file by finding, for each of the at least one second file, a difference between a set of features of the first file and the calculated at least one set of features of the second file; and
      detect a presence of potentially malicious changes in the identified set of distinguishing features of the first file, characterized in that the potentially malicious changes comprise at least a change that indicates a presence of at least one code loader for loading of code from encrypted files or from sections of files not intended for code storage, or from third-party servers.

9. The system of claim 8, wherein the at least one set of features comprises at least a hash of a dex-class.

10. The system of claim 9, wherein the hash of the dex-class is calculated from at least one of: a code of a class without taking into account names of classes, or from the code of the class without taking into account names of methods of the class.

11. The system of claim 8, wherein the at least one set of features comprises at least one of:
   information obtained from a manifest of the first file,
   information about requested permissions of the first file, and
   information about a presence of encrypted resources in the first file.

12. The system of claim 8, wherein the presence of potentially malicious changes are detected using a method based on at least one of: heuristic analysis or signature analysis.

13. The system of claim 8, wherein the potentially malicious changes further comprise:
   a change that indicates a presence of an application programming interface function that is known as being untrustworthy.

14. The system of claim 8, wherein the file selected to be analyzed comprises an application installation file for mobile devices.

15. A non-transitory computer readable medium storing thereon computer executable instructions for detecting potentially malicious changes in an application, including instructions for:
   selecting a first file to be analyzed and at least one second file similar to the first file, wherein the similarity of the at least one second file with the first file is based on at least one of: names of the first file and the at least one second file, and versions of the first file and the at least one second file;
   for each of the at least one second file, calculating at least one set of features;
   identifying a set of distinguishing features of the first file by finding, for each of the at least one second file, a difference between a set of features of the first file and the calculated at least one set of features of the second file; and
   detecting a presence of potentially malicious changes in the identified set of distinguishing features of the first file, characterized in that the potentially malicious changes comprise at least a change that indicates a presence of at least one code loader for loading of code from encrypted files or from sections of files not intended for code storage, or from third-party servers.

16. The non-transitory computer readable medium of claim 15, wherein the at least one set of features comprises at least a hash of a dex-class.

17. The non-transitory computer readable medium of claim 16, wherein the hash of the dex-class is calculated from at least one of: a code of a class without taking into account names of classes, or from the code of the class without taking into account names of methods of the class.

18. The non-transitory computer readable medium of claim 15, wherein the at least one set of features comprises at least one of:
   information obtained from a manifest of the first file,
   information about requested permissions of the first file, and
   information about a presence of encrypted resources in the first file.

19. The non-transitory computer readable medium of claim 15, wherein the presence of potentially malicious changes are detected using a method based on at least one of: heuristic analysis or signature analysis.

20. The non-transitory computer readable medium of claim 15, wherein the potentially malicious changes further comprise:
   a change that indicates a presence of an application programming interface function that is known as being untrustworthy.

21. The non-transitory computer readable medium of claim 15, wherein the file selected to be analyzed comprises an application installation file for mobile devices.

\* \* \* \* \*